United States Patent [19]

Holly et al.

[11] 3,747,160

[45] July 24, 1973

[54] MOLDING APPARATUS

[75] Inventors: James A. Holly; Edmund Schneider, Glenwood, both of Richton Park, Ill.

[73] Assignee: Hollymatic Corporation, Park Forest, Ill.

[22] Filed: Sept. 8, 1971

[21] Appl. No.: 178,645

[52] U.S. Cl. .................................. 17/32, 425/444
[51] Int. Cl. .............................................. A22c 7/00
[58] Field of Search ......................... 17/32; 53/122; 425/438, 444, 215, 217

[56] References Cited
UNITED STATES PATENTS
1,327,806   1/1920   Bunde .............................. 425/444

*Primary Examiner*—Robert Peshock
*Attorney*—Axel A. Hofgren et al.

[57] ABSTRACT

A molding apparatus for forming simultaneously a plurality of articles and specifically patties from a moldable material and specifically ground meat, fish or other edible material in which a movable mold having a plurality of mold openings is provided together with means for moving the mold longitudinally between charging and discharging stations for the mold openings with one of a pair of the openings being located generally longitudinally forwardly of the other and a pressurized supply of the pressure flowable plastic and moldable material for supplying the material to the openings substantially simultaneously at the charging station.

24 Claims, 3 Drawing Figures

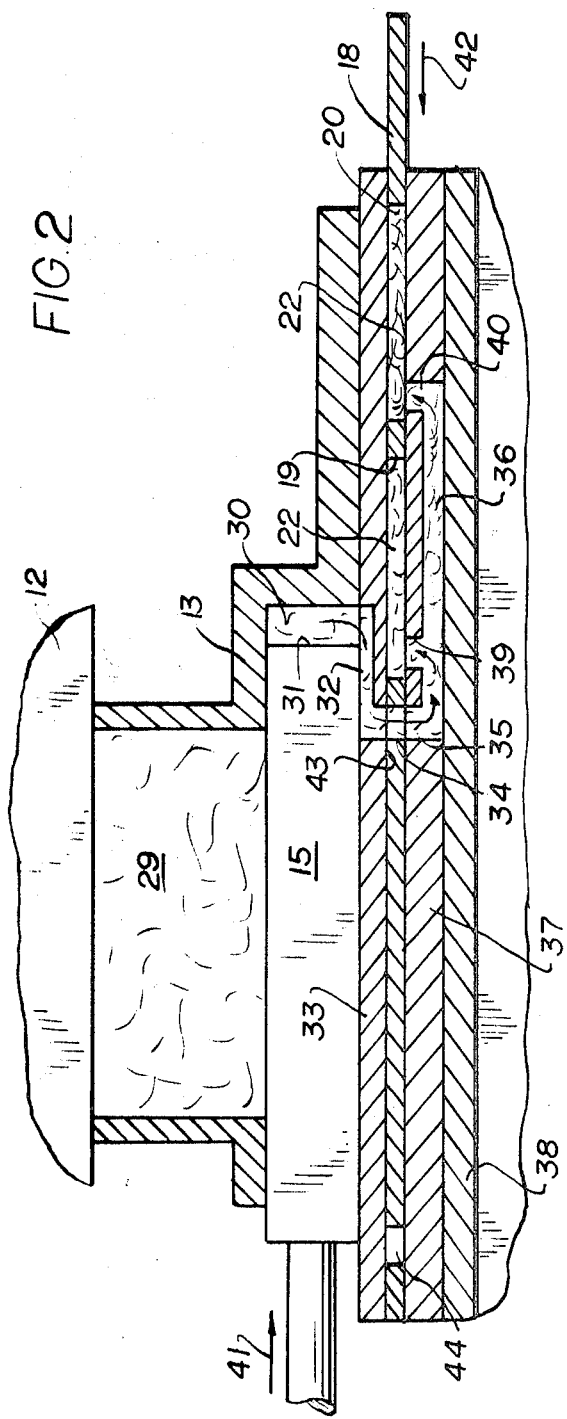
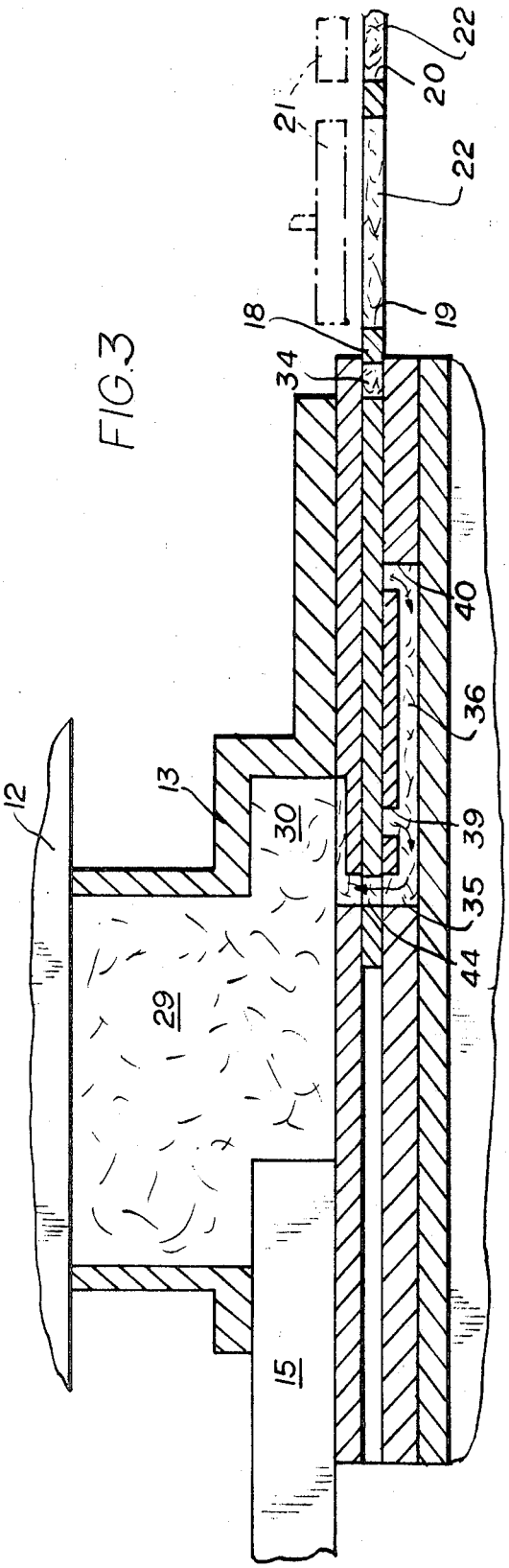

3,747,160

MOLDING APPARATUS

BACKGROUND OF THE INVENTION

This invention relates to molding apparatus particularly for forming articles such as patties from plastic material such as ground meat, fish and the like in which a number of articles are produced simultaneously. The invention is related to James A. Holly prior U.S. Pat. No. 3,417,425, dated Dec. 24, 1968 and assigned to the present assignee. Both in this patent and in the present invention the moldable material is forced by pressure means such as a reciprocating ram into a mold opening in a mold plate at the charging station and this pressure is maintained until the mold opening has been moved out of communication with the pressurized supply and toward the discharging station.

The invention is also related to James A. Holly copending patent application Ser. No. 26,814, filed Apr. 9, 1970 and now U.S. Pat. No. 3,654,665 issued Apr. 11, 1972 and also assigned to the same assignee as the present application. In this patent there is disclosed apparatus for producing a plurality of patties simultaneously by providing mold openings extending across the width of a mold plate and providing any number of mold plates, as desired, positioned side-by-side.

In the present invention there is also disclosed and claimed a molding apparatus for forming simultaneously a plurality of articles but in the present invention the mold openings are arranged so that some are positioned generally longitudinally forwardly of other openings with the result that more articles such as patties can be produced simultaneously from a mold and particularly a mold plate of a given width. Thus in the present invention the mold openings can be arranged in a group transversely of the mold plate, as in the above U.S. Pat. No. 3,654,665, and they can also be arranged so that some are positioned forwardly of others in relation to the longitudinal dimension of the mold plate. Thus the number of mold openings provided and the number of articles produced is not limited by the width of the mold as the length thereof is also utilized in providing the openings for producing simultaneously a plurality of the molded articles.

There are issued patents disclosing patty making machines for forming a number of patties simultaneously and even for filling a plurality of mold openings from a single manifold. The most pertinent prior patents of which applicants are aware are U.S. Pat. Nos. 2,814,921; 3,177,524; 3,296,655 and 3,416,187. None of these, however, have solved the problems or proposed the structure whereby not only the width of a mold particularly a mold plate but also a portion of the length thereof are used for providing a large plurality of article forming molds to produce a large plurality of articles simultaneously.

BRIEF DESCRIPTION OF THE DRAWINGS

FIG. 2 is an enlarged longitudinal and vertical sectional view through the apparatus of FIG. 1 omitting certain agitators for clarity of illustration but showing the simultaneous filling of a pair of mold openings one located forwardly of the other.

FIG. 3 is a view similar to FIG. 2 but showing the mold at a discharge station or at a position opposite to the position of FIG. 2.

DESCRIPTION OF THE PREFERRED EMBODIMENT

Figure 1:
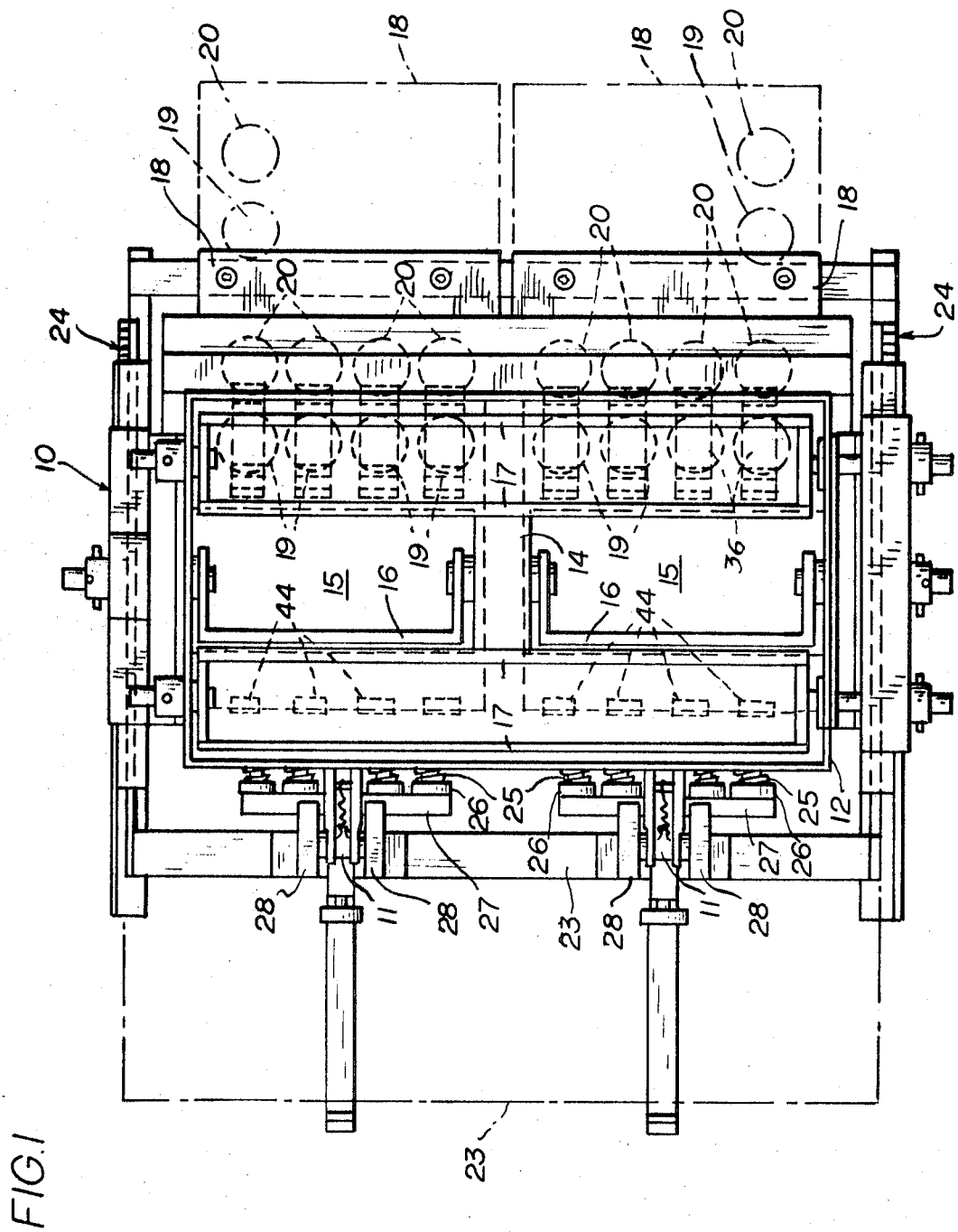
FIG. 1 is a plan view of a multiple patty forming apparatus embodying the invention and forming sixteen circular patties of ground raw beef or other food material simultaneously.

The molding apparatus 10 is substantially the same as the apparatus shown, described and claimed in the above patent 3,654,665 except for an improved catch structure 11 that is shown, described and claimed in James A. Holly U.S. Pat. No. 3,693,213 dated Sept. 26, 1972, and like the two others mentioned herein assigned to the present assignee. The apparatus 10 includes a hopper 12 having a bottom section 13 divided by a central partition 14 so as to provide two halves in each of which is located a horizontally reciprocable ram 15.

In order to provide for a smooth uninterrupted flow of moldable material and particularly adhesive food material such as ground meat downwardly in the hopper to the rams 15 there are provided arcuately reciprocable agitators 16 in each hopper bottom section above a ram 15 and a pair of rotatable movers devices 17 above and on opposite sides of the agitator 16. These agitators and mover devices and the operating means therefor are disclosed and claimed in the above U.S. Pat. No. 3,654,665.

As dislosed in enlarged detail in FIGS. 2 and 3 there is provided at least one mold plate 18, and in this disclosed embodiment a pair of side-by-side mold plates, each containing a plurality of sets (here shown as two) of side-by-side mold openings 19 and 20. In the illustrated embodiment the mold openings 20 are located forwardly of the mold opening 19 so that there is thus provided two rows of eight openings for forming 16 patties simultaneously.

As is explained in more detail and claimed in the above patents the mold plates 18 are reciprocated between a charging station illustrated in FIG. 2 and a discharging station shown in FIG. 3. At the discharging station there are prOvided two sets of the customary knockout rings illustrated schematically at 21 which are lowered simultaneously into the mold openings 19 and 20 for dislodging the formed patties 22 therefrom. As the knockout rings and the operating mechanism therefor are not essential to the present invention as claimed they are not illustrated in detail.

The mold plate or plates 15 are reciprocated from the position of FIG. 2 to the position of FIG. 3 and back again in timed sequence while at the same time the ram or rams 15 are reciprocated so that at the charging station the rams are in their forward position as shown in FIG. 2 while at the discharging station the rams 15 are at their greatest retracted position as shown in FIG. 3. The apparatus for reciprocating the ram or rams 15 which is shown in greater detail and claimed in the above U.S. Pat. No. 3,654,665 includes a horizontal bar 23 that is reciprocated by side drive racks and pinions 24 between a forwardmost position as shown in FIG. 2 and in solid lines in FIG. 1 and a rearwardmost position of the bar 23 as shown in FIG. 3 and in broken lines at the left side of FIG. 1.

Also as illustrated and claimed in the U.S. Pat. No. 3,654,665 there are provided precompressed springs 25, adjustable nuts 26 for applying this precompression and cross bars 27 for each ram 15.

In order to retain each ram 15 in its forwardmost position of FIG. 2 until the mold plate has been moved forwardly away from the charging sation there is provided the catch 11 and retainer 28 for each ram 15 also as described and claimed in the U.S. Pat. No. 3,654,665.

As can be seen from the above description the mold openings 19 and 20 are arranged in sets in which one opening 20 of a pair of openings 19 and 20 is located generally longitudinally forwardly of the other opening 19. The ram 15 thereupon functions as a pressure exerting part of a supply means for supplying the moldable and flowable plastic material such as ground meat 29 under pressure to the openings.

Thus, as illustrated in FIG. 2, at the charging station the ram 15 is in its forwardmost position to extend into the bottom section 13 of the hopper 12 to force material from the space 30 in front of the forward end 31 of the ram, down into and rearwardly through a channel 32 in a top plate base member 33, down through a passage means 34 in the form of a transverse slot in the mold plate 18 and into the entrance end 35 of an elongated manifold 36 in a bottom base member 37. The mold plate 18 is thereby mounted for reciprocation between the base members 33 and 37 with the bottom base member 37 being supported by a frame plate 38.

The manifold 36 has a pair of upwardly extending spaced passages 39 and 40 leading to the mold openings 19 and 20, respectively, at the rear edges thereof when the mold plate 18 has been retracted to its charging position as shown in FIG. 2. As is explained in more detail in U.S. Pat. in the above 3,654,665 the rack and pinion drive 24 reciprocates the ram 15 forwardly as indicated by the arrow 41 while the mold plate is reciprocated rearwardly as indicated by the arrow 42. It is of course evident that in the position of FIG. 2 both the ram 15 and the mold plate 18 are temporarily stationary to provide the time interval for filling the mold openings 19 and 20.

In the illustrated embodiment therefore the one base member 33 is located on the upper side of the mold plate 18 that is adjacent the pressurized material supply means 29–32 and with the passage means 34 communicating with this supply means when the mold plate is in charging position. The other or bottom base member 37 is located at the side of the mold plate opposite to the supply means or at the bottom of the mold plate. It is in this bottom base member 37 in the illustrated embodiment that the manifold 36 with its entrance 35 and spaced filling passages 39 and 40 are located. With this structure the area 43 of the mold plate adjacent to or here just to the rear of the passage 34 operates as a valve to close off the supply means passage 32 as soon as the mold plate has been moved forwardly a short distance toward the discharge position of FIG. 3. As is pointed out earlier, the catch structure 11 maintains the rams 15 in their forwardmost position until the mold openings have been moved away from the discharge position. Thus the mold plate area 43 serves as a valve to aid this maintaining of the compression on the material in the manifold 36 and thus on the patties 22 so that the meat cannot expand back into the space 30 ahead of the ram 15.

With the meat in the manifold 36 and passages 39 and 40 being thusly maintained under pressure it has been found preferable to release this pressure before the mold openings and particularly the opening 19 has been returned to its charging position of FIG. 2 from the discharging position of FIG. 3. This is true because with the material and particularly meat which is somewhat compressible because of trapped air between the meat particles there is a tendency for this pressure to be released into the empty mold opening 19 as it starts to pass over the first manifold passage 40. This releasing of pressure into the mold opening 19 forces a slug of meat into the mold which then does not blend into the incoming meat entering the mold opening 19 at the manifold passage 39. When this occurs there is a tendency for the meat patty during cooking to break in view of the nonuniformity of the meat in the opening.

In order to avoid this each mold plate 18 is provided with a transverse pressure relief slot 44 a distance rearwardly of the rear mold opening 19 so that when the mold plate 18 is in its forwardmost or discharge position of FIG. 3 the pressure relief slot 44 will connect the entrance end 35 of the manifold with the material supply space 30. This permits the pressure in the manifold 36 to be relieved by flow of material rearwardly and upwardly into the space 30. Then when the mold plate 18 has been fully retracted to its loading position of FIG. 2 the mold opening 19 can be filled with the same uniformity as the companion mold opening 20.

In the illustrated embodiment there are aligned pairs of mold openings 19 and 20 each provided with its own supply passage 30 and 32 and manifold 36 and each with its own pressure relief slot 44. During the operation of the apparatus each ram 15 is reciprocated between the forward position of FIG. 2 and the rearward position of FIG. 3 and back again in repeating cycles. Simultaneously the mold plate 18 is reciprocated between the charging position of FIG. 2 and the discharging position of FIG. 3 and back again. During each reciprocation the forward position of each ram 15 forces material 29 into the pairs 19 and 20 of mold openings by way of the plurality of manifolds 36. Then, on movement of the mold plate 18 forwardly to the discharge position of FIG. 3 the confined pressure in the manifold 36 is released back into the hopper bottom 13 by way of the pressure relief slots 44 as shown in FIG. 3.

We claim:

1. Molding apparatus for forming simultaneously a plurality of articles from a pressure flowable plastic and moldable material, comprising: a movable mold having a plurality of mold openings for forming said articles therein; means for moving said mold longitudinally between charging and discharging stations for said mold openings, one of a pair of said openings being located generally longitudinally forwardly of the other; and supply means for supplying said material under pressure to said openings substantially simultaneously at said charging station.

2. The apparatus of claim 1 wherein said pair of openings are substantially longitudinally aligned.

3. The apparatus of claim 1 wherein there are provided a base member relative to which said means for moving moves said mold between said charging and discharging stations and a manifold in said base member communicating with said pair of openings and said supply means when said mold is at said charging station.

4. The apparatus of claim 1 wherein said supply means includes pressure means and means for periodically operating said pressure means to apply pressure to said material when said openings are at said charging station and thereafter to release said pressure.

5. The apparatus of claim 1 wherein there are provided a base member relative to which said means for moving moves said mold between said charging and discharging stations, a manifold in said base member communicating with said pair of openings and said supply means when said mold is at said charging station and said supply means includes pressure means and means for periodically operating said pressure means to apply pressure to said material when said openings are at said charging station and thereafter to release said pressure.

6. Molding apparatus for forming simultaneously a plurality of articles from a pressure flowable plastic and moldable material, comprising: a movable mold having a plurality of mold openings for forming said articles therein; means for moving said mold longitudinally between charging and discharging stations for said mold openings, one of a pair of said openings being located generally longitudinally forwardly of the other; supply means for supplying said material under pressure to said openings substantially simultaneously at said charging station; a base member against which said mold is movable between said charging and discharging stations, said supply means comprising a manifold in said base member leading to said pair of openings when said mold is at said charging station; and pressure release means in said mold movable therewith and communicating with said supply means and manifold simultaneously when said mold is at said discharging station for releasing pressure of material in said manifold back to said supply means, said supply means including pressure means and means for periodically operating said pressure means to apply pressure to said material when said openings are at said charging station and thereafter to release said pressure.

7. The apparatus of claim 6 wherein said supply means comprises a passage means extending through said mold and into said manifold when the mold is at said charging station and out of communication with said manifold when the mold is moved from said charging station.

8. The apparatus of claim 6 wherein said supply means includes pressure means and means for periodically operating said pressure means to apply pressure to said material when said openings are at said charging station and thereafter to release said pressure.

9. Molding apparatus for forming simultaneously a plurality of articles from a pressure flowable plastic and moldable material, comprising: a movable mold having a plurality of mold openings for forming said articles therein; means for moving said mold longitudinally between charging and discharging stations for said mold openings, a pair of said openings being substantially longitudinally aligned; supply means for supplying said material under pressure to said openings substantially simultaneously at said charging station; a base member relative to which said means for moving moves said mold between said charging and discharging stations; and a manifold in said base member communicating with said pair of openings and said supply means when said mold is at said charging station, said supply means including pressure means and means for periodically operating said pressure means to apply pressure to said material when said openings are at said charging station and thereafter to release said pressure.

10. Molding apparatus for forming simultaneously a plurality of articles from a pressure flowable plastic and moldable material, comprising: a movable mold having a plurality of mold openings for forming said articles therein; means for moving said mold longitudinally between charging and discharging stations for said mold openings, a pair of said openings being substantially longitudinally aligned; supply means for supplying said material under pressure to said openings substantially simultaneously at said charging station; a base member relative to which said means for moving moves said mold between said charging and discharging stations; a manifold in said base member communicating with said pair of openings and said supply means when said mold is at said charging station, said supply means including pressure means and means for periodically operating said pressure means to apply pressure to said material when said openings are at said charging station and thereafter to release said pressure; and manifold pressure release means in said mold movable therewith and communicating with both said supply means and said manifold when said mold is at said discharging station for releasing pressure of material in said manifold back to said supply means.

11. The apparatus of claim 10 wherein said supply means comprises a passage means extending through said mold in communication with said manifold when the mold is at said charging station and out of communication with said manifold when the mold is moved from said charging station.

12. Molding apparatus for forming simultaneously a plurality of articles from a pressure flowable plastic and moldable material, comprising: a movable mold movable in a longitudinal direction and having a plurality of mold openings for forming said articles arranged transversely to and longitudinally of said direction, one of an adjacent longitudinally spaced pair of said openings being located generally forwardly of the other; means for moving said mold longitudinally between charging and discharging stations for said mold openings; and supply means for supplying said material to each said pair of openings simultaneously at said charging station.

13. The apparatus of claim 12 wherein there are provided a base member relative to which said means for moving moves said mold between said charging and discharging stations and a plurality of manifolds in said base member each communicating with a said pair of openings and said supply means when said mold is at said charging station.

14. The apparatus of claim 12 wherein each said pair of openings are substantially longitudinally aligned.

15. Molding apparatus for forming simultaneously a plurality of articles from a pressure flowable plastic and moldable material, comprising: a movable mold movable in a longitudinal direction and having a plurality of mold openings for forming said articles arranged transversely to and longitudinally of said direction, one of an adjacent longitudinally spaced pair of said openings being located generally forwardly of the other; means for moving said mold longitudinally between charging and discharging stations for said mold openings; supply means for supplying said material to each said pair of openings simultaneously at said charging station; a base member relative to which said means for moving moves said mold between said charging and discharging stations and a plurality of manifolds in said base member each communicating with a said pair of openings and said supply means when said mold is at said charging station, said supply means including pressure means; and means for periodically operating said pressure means to apply pressure to said material when said openings are at said charging station and thereafter to release said pressure.

16. Molding apparatus for forming simultaneously a plurality of articles from a pressure flowable plastic and moldable material, comprising: a movable mold movable in a longitudinal direction and having a plurality of mold openings for forming said articles arranged transversely to and longitudinally of said direction, one of an adjacent longitudinally spaced pair of said openings being located generally forwardly of the other; means for moving said mold longitudinally between charging and discharging stations for said mold openings; supply means for supplying said material to each said pair of openings simultaneously at said charging station; a base member against which said mold is movable between said charging and discharging stations, said supply means comprising a plurality of manifolds in said base member each communicating with a said pair of openings when said mold is at said charging station; manifold pressure release means in said mold movable therewith and communicating with both said supply means and said manifold simultaneously when said mold is at said discharging station for relasing pressure of material in said manifold, said supply means including pressure means; and means for periodically operating said pressure means to apply pressure to said material when said openings are at said charging station and thereafter to release said pressure.

17. The apparatus of claim 12 wherein said supply means comprises a passage means extending through said mold and into communication with said manifold when the mold is at said charging station.

18. The apparatus of claim 17 wherein there are provided a base member relative to which said means for moving moves said mold between said charging and discharging stations and a plurality of manifolds in said base member each communicating with a said pair of openings and said supply means when said mold is at said charging station, said supply means including pressure means and means for periodically operating said pressure means to apply pressure to said material when said openings are at said charging station and thereafter to release said pressure.

19. Molding apparatus for forming simultaneously a plurality of articles from a pressure flowable plastic and moldable material, comprising: a movable mold plate having a plurality of mold openings therein for forming said articles; means for moving said mold plate longitudinally between charging and discharging stations for said mold openings, one of a pair of said openings being located generally longitudinally forwardly of the other; supply means for supplying said material under pressure to said openings substantially simultaneously at said charging station; a pair of base members between which said mold plate is held for said movement between said stations, one of said base members being located adjacent said supply means and the other at the side of the mold plate opposite to said supply means; and a manifold in one said base member communicating with said pair of openings and said supply means when said mold is at said charging station.

20. The apparatus of claim 19 wherein said supply means includes pressure means and means for periodically operating said pressure means to apply pressure to said material when said openings are at said charging station and thereafter to release said pressure.

21. The apparatus of claim 20 wherein there are provided means for maintaining said pressure on the material until said openings have been moved from said charging station.

22. Molding apparatus for forming simultaneously a plurality of articles from a pressure flowable plastic and moldable material, comprising: a movable mold plate having a plurality of mold openings therein for forming said articles; means for moving said mold plate longitudinally between charging and discharging stations for said mold openings, one of a pair of said openings being located generally longitudinally forwardly of the other; supply means for supplying said material under pressure to said openings substantially simultaneously at said charging station; a pair of base members between which said mold plate is held for said movement between said stations, one of said base members being located adjacent said supply means and the other at the side of the mold plate opposite to said supply means; a manifold in one said base member communicating with said pair of openings and said supply means when said mold is at said charging station, said manifold being located in said base member that is at the side of the mold plate opposite to said supply means; and passage means in said mold plate communicating with said supply means and said manifold when said mold plate is at said charging station, said mold plate in the area adjacent said passage means thereby comprising means for maintaining said pressure on the material until said openings have been moved from said charging station.

23. Molding apparatus for forming an article from a pressure flowable plastic and moldable material, comprising: a movable mold having a mold opening for forming said article therein; means for moving said mold between charging and discharging stations for said mold opening; supply means for supplying said material under pressure to said opening at said charging station; a base member against which said mold is movable between said charging and discharging stations, said supply means comprises a supply passage in said base member leading to said opening when said mold is at said charging station; and pressure release means in said mold movable therewith and communicating with said supply means and supply passage simultaneously when said mold is at said discharging station for releasing pressure of material in said supply passage back to said supply means, said supply means including pressure means and means for periodically operating said pressure means to apply pressure to said material when said opening is at said charging station and thereafter to release said pressure.

24. The apparatus of claim 23 wherein said supply means comprises a passage means extending through said mold and into said supply passage when the mold is at said charging station and out of communication with said supply passage when the mold is moved from said charging station.

* * * * *